(12) United States Patent
Carberry et al.

(10) Patent No.: US 7,254,539 B2
(45) Date of Patent: Aug. 7, 2007

(54) BI-DIRECTIONAL NATURAL LANGUAGE SYSTEM FOR INTERFACING WITH MULTIPLE BACK-END APPLICATIONS

(75) Inventors: Martin D. Carberry, Margate, FL (US); Mark E. Epstein, Westchester, NY (US); Glenn T. Puchtel, Boca Raton, FL (US); Susan M. Wingate, Monroe, FL (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 10/178,807

(22) Filed: Jun. 24, 2002

(65) Prior Publication Data

US 2002/0156629 A1    Oct. 24, 2002

Related U.S. Application Data

(62) Division of application No. 09/415,660, filed on Oct. 12, 1999, now Pat. No. 6,442,522.

(51) Int. Cl.
*G10L 15/00* (2006.01)

(52) U.S. Cl. .............................. 704/257; 704/8; 704/9; 707/4; 707/10; 709/201; 712/216

(58) Field of Classification Search ................ 704/257, 704/8–10; 707/4, 10; 709/201; 712/216; 711/1

See application file for complete search history.

(56) References Cited

U.S. PATENT DOCUMENTS 5,386,556 A * 1/1995 Hedin et al. .................... 707/4

5,490,258 A * 2/1996 Fenner ........................... 711/1

(Continued)

FOREIGN PATENT DOCUMENTS

| JP | 03-011456 | * 1/1991 |
|---|---|---|
| JP | 05-035780 | * 2/1993 |
| JP | 07-078171 | * 3/1995 |

OTHER PUBLICATIONS

Shim ("Structural Disambiguation Using Statistical Information And The Measurement Of Confidence In Attachment", IEEE Region 10 Conference on Computer, Communication, Control and Power Engineering, pp. 1066-1069 vol.2, Oct. 1993).*

(Continued)

*Primary Examiner*—Vijay Chawan
(74) *Attorney, Agent, or Firm*—Douglass A. Lashmit; Hoffman, Warnick & D'Alessandro

(57) ABSTRACT

A system and method for servicing natural language requests with a plurality of remote host systems. The system utilizes a computer program that comprises: (1) an input system for inputting an NL command; (2) a translation system that extracts a request from the NL command and stores the request in a host-independent format; and (3) a routing system for servicing the request, wherein the routing system comprises a mechanism for selecting a host, for converting the request into a host dependent directive, and for forwarding the directive to the selected host. The system may further include a speech recognition system, a local data source for servicing the NL command, templates for converting the request into the host dependent directive, a heuristic for selecting the host, and an output system for obtaining and outputting the response.

5 Claims, 6 Drawing Sheets

U.S. PATENT DOCUMENTS 5,677,835 A * 10/1997 Carbonell et al. ............. 704/8
5,706,434 A * 1/1998 Kremen et al. ............... 707/10
5,842,224 A * 11/1998 Fenner ......................... 711/1
5,991,795 A * 11/1999 Howard et al. ............. 709/201
6,189,088 B1 * 2/2001 Gschwind ................... 712/216

OTHER PUBLICATIONS

Moldovan et al ("Using Wordnet And Lexical Operators To Improve Internet Searches", IEEE Internet Computing, vol. 4 Issue pp. 34-43, Jan. 2000).*

* cited by examiner

FIG. 7

| FLIGHT AVAIL | DAY | MONTH | DEP TIME | ARR TIME | DEP CITY | ARR CITY | AIRLINE | MEAL | FLIGHT | STOPS | HOST # | RESPONSE # | REQUEST # |
|---|---|---|---|---|---|---|---|---|---|---|---|---|---|
| 1 | 31 | DEC | 1500 | 1800 | MIA | BOS | AA | DIN | 832 | 0 | 2 | 1 | 1 |
| 1 | 31 | DEC | 1520 | 1900 | MIA | BOS | AA | DIN | 1014 | 0 | 2 | 2 | 1 |
| 2 | 20 | NOV | 630 | 1030 | ALB | ORL | UN | BK | 111 | 1 | 6 | 1 | 2 |
| 1 | 20 | NOV | 700 | 1120 | ALB | ORL | DLT | BK | 907 | 1 | 6 | 2 | 2 |
| 1 | 20 | NOV | 710 | 1030 | ALB | ORL | AA | BK | 4210 | 0 | 6 | 3 | 2 |

FIG. 6

| FLIGHT AVAIL | DAY | MONTH | DEP TIME | ARR TIME | DEP CITY | ARR CITY | AIRLINE | MEAL | FLIGHT | STOPS | HOST # | REQUEST # |
|---|---|---|---|---|---|---|---|---|---|---|---|---|
| 1 | 31 | DEC | 1500 | – | MIA | BOS | AA | – | – | – | – | 1 |
| – | 20 | NOV | AM | – | ALB | ORL | – | – | – | – | – | 2 |

BI-DIRECTIONAL NATURAL LANGUAGE SYSTEM FOR INTERFACING WITH MULTIPLE BACK-END APPLICATIONS

This application is a divisional of U.S. patent application, Ser. No. 09/415,660, filed Oct. 12, 1999 now U.S. Pat. No. 6,442,522.

BACKGROUND

1. Technical Field

The present invention relates to natural language command systems, and more specifically, to natural language command systems that interface with multiple back-end applications.

2. Related Art

The ability to provide efficient mechanisms for interfacing with today's electronic commerce environment remains an ongoing challenge. A fundamental problem is that, in any given field, there exist numerous potential resources capable of servicing an end user's needs. Depending upon the situation, certain resources may be more effective or cost efficient than others. Deciding which resource to utilize and providing the systems to interface with multiple resources can become unmanageable in an ever changing electronic environment. When dealing with multiple resources, it is not unusual to be confronted with a lack of uniformity among service providers. Thus, for a given service, providers will often employ proprietary or independent systems that utilize their own formats or syntax for receiving and/or distributing information. This often results in a situation where an end-user begins to favor a resource that they are comfortable with or knowledgeable about. However, there is no guarantee that a chosen resource will provide the best response to a given query or instruction, since better suited resources may exist.

One exemplary field where the aforementioned problems are prevalent involves computer reservation systems (CRS). Travel agents use CRS to make reservations with airlines, hotels, car rental agencies, bus lines, and railroads. For example, a travel agent may want to know what the available flights are from Miami to Boston on a given date. Examples of CRS's include SABRE™, SYSTEM ONE™, APOLLO™, AMADEUS™ and WORLDSPAN™. Unfortunately, code language formats, which are a combination of cryptic codes and characters, vary widely between each CRS even though a typical request is simple and common regardless of the CRS being used.

Because different computer reservation systems utilize different code language formats, a travel agent needs to learn a number of different code languages if that agent desires to interact with more than one CRS. Learning each new CRS's code language costs the travel agency additional time and money. Moreover, a travel agent can easily become confused when interacting with one of the computer reservation systems because of the variation in code words. As a result, a travel agent may erroneously enter a code for one CRS while attempting to interact with a second CRS. Such mistakes decrease the travel agent's efficiency in serving customers.

U.S. Pat. No. 5,781,892, METHOD AND APPARATUS FOR INTERACTING WITH A COMPUTER RESERVATION SYSTEM, issued to Hunt et. al, on Jul. 14, 1998, hereby incorporated by reference, describes a CRS that uses an application program interface to convert the cryptic CRS codes into a single user friendly language. While this is helpful to some extent, the end-user must still learn to interact with the system in a defined syntax. U.S. Pat. No. 5,842,176, METHOD AND APPARATUS FOR INTERACTING WITH A COMPUTER RESERVATION SYSTEM, issued to Hunt et. al, on Nov. 24, 1998, hereby incorporated by reference, describes a system for allowing multiple sessions to be established with a single CRS. This invention does not help identify the best CRS for a given query. Moreover, while it is possible to manually query multiple CRS's, the cost and time associated with multiple queries can become prohibitive, because each query into a CRS has an associated cost.

A further problem not adequately solved by the prior is that an end-user often must submit a series of queries into a CRS to obtain the exact information required. For example, an end-user might first query for flights between Boston and Miami on a given date. If an adequate flight does not exist, the end-user may have to query for a flight on a different day, or query for a flight to a nearby airport. This series of queries can continue indefinitely until an adequate flight is located, at which time the end-user might book the flight. Accordingly, given the described problems in submitting queries, there exists a tremendous burden involved in re-entering the same set of information over and over again, with only minor variations. U.S. Pat. No. 5,832,454, RESERVATION SOFTWARE EMPLOYING MULTIPLE VIRTUAL AGENTS, issued to Jafri et al., on Nov. 3, 1998, hereby incorporated by reference, attempts to address the above problem by using embedded rules to generate "near-immediate" results to provide multiple priced itineraries. While this teaching may be helpful in certain limited circumstances, it often will merely generate unwanted information, and do nothing to limit the data entry required for refining an end-user query.

Accordingly, a need exists to provide a comprehensive system that comprises a uniform and easy-to-use interface that can communicate with multiple resources, a system for effectively selecting from the multiple resources, and a system that will allow users to easily modify and refine requests during a series of related queries.

SUMMARY OF THE INVENTION

The present invention addresses the above-mentioned problems by providing a system and method that allows requests to be serviced by one or more resources, or hosts. The system utilizes a program product with a natural language (NL) user interface, wherein the computer program comprises: (1) an input system for inputting an NL command; (2) a translation system that extracts a request from the NL command and stores the request in a host-independent format; and (3) a routing system for servicing the request, wherein the routing system comprises a mechanism for selecting a host, for converting the request into a host dependent directive, and for forwarding the directive to the selected host. The system may further include a speech recognition system, a local data source for servicing the NL command, templates for converting the request into the host dependent directive, a heuristic for selecting the host, and an output system for obtaining and outputting intelligent natural language responses.

The method according to the invention includes the steps of: (1) inputting an NL command into a natural language translator; (2) interpreting a request from the NL command; (3) storing the request in a host-independent format; (4) attempting to service the request with a local data source; (5) if a local data source is not available to service the request, performing the steps of: (a) selecting a host; (b) converting the request to a host dependent directive; and (c) submitting the host dependent directive to the selected host; and (6) obtaining and outputting a response.

In addition, the invention may comprise a context mechanism to interpret natural language instructions, wherein the context mechanism comprises: (1) a context database that stores responses obtained in response to previous requests, wherein each response comprises response elements; (2) a context requirement mechanism that determines if a current request comprising a current set of request elements is ambiguous; (3) a context retrieving mechanism that retrieves response elements from the context database; and (4) a disambiguation mechanism that uses the retrieved response elements to disambiguate the current set of request elements. In addition, the context mechanism can also store request elements and use the previous request elements to disambiguate the current set of request elements. The context mechanism can be in the form of a system or program product.

It is therefore an advantage of the present invention to provide a system for interfacing with a plurality of hosts using a natural language interface.

It is therefore a further advantage of the present invention to provide a host-independent format for storing requests.

It is therefore a further advantage of the present invention to provide format templates for converting host-independent requests into host-dependent directives.

It is therefore a further advantage of the present invention to provide a heuristic for selecting the host.

It is therefore a further advantage of the present invention to provide a context mechanism that allows an end-user to submit a series of related commands without having to resubmit each command in its entirety.

It is therefore a further advantage of the present invention to provide intelligent responses to the end-user.

These and other advantages will be described in more detail in reference to the drawings and detailed description provided below.

BRIEF DESCRIPTION OF THE DRAWINGS

The preferred exemplary embodiment of the present invention will hereinafter be described in conjunction with the appended drawings, where like designations denote like elements, and:

FIG. 6 depicts a request database; and

FIG. 7 depicts a response database.

DETAILED DESCRIPTION OF THE DRAWINGS

Figure 1:
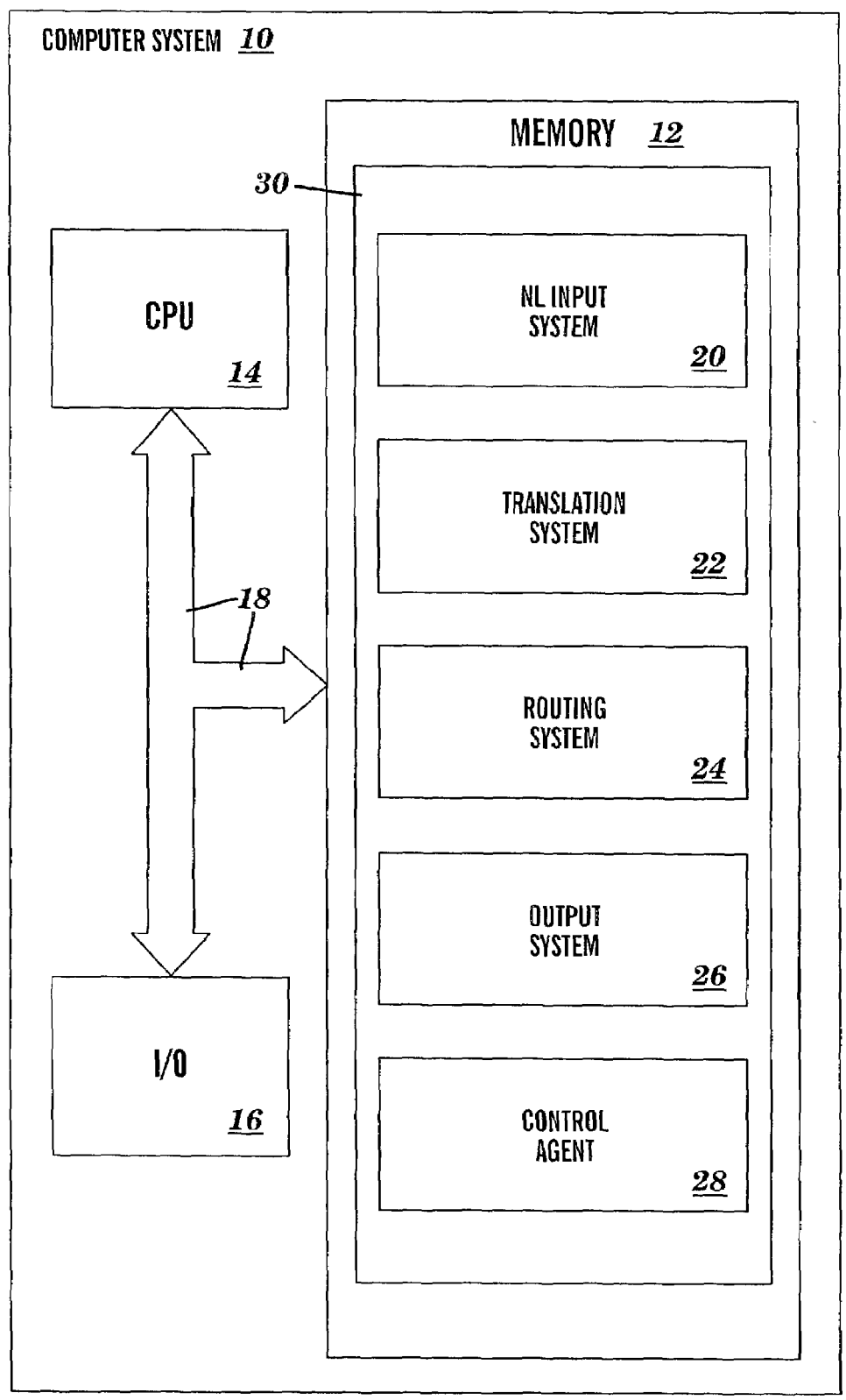
FIG. 1 depicts a block diagram of a computer system with a computer program in accordance with a preferred embodiment of the present invention.

Referring now to FIG. 1, a computer system 10 depicting an embodiment of the present invention is shown comprising memory 12, a central processing unit (CPU) 14, input output system (I/O) 16, and bus 18. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 14 may likewise comprise a single processing unit, or be distributed across one or more processing units in one or more locations, e.g., on a client and server. I/O 16 may comprise any known type of input output device, including a keyboard, mouse, voice recognition, speech output, CRT, printer, disk drives, etc. Bus 18 provides a communication link between each of the components in the computer system 10 and likewise may comprise any known type of transmission link, including electrical, optical, radio, etc. In addition, although not shown, additional components, such as cache memory, communication systems, system software, etc., may be incorporated into computer system 10.

It is understood that the present invention can be realized in hardware, software, or a combination of hardware and software. The computer system 10 according to the present invention can be realized in a centralized fashion in a single computer, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program, software program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Stored in memory 12 is software program 30 that allows an end-user to interface with a plurality of back end "hosts" using natural language (NL) commands. A host may be defined as a computerized resource for providing on-line information and services, such as a computerized reservation system (CRS). While this embodiment is described with reference to CRS'S, it should be recognized that the invention covers any application that may potentially interact with a plurality of resources or hosts. As noted, the present invention uses NL commands for the interface. A natural language interface provides a system by which information can be extracted from normally spoken or written commands, phrases or sentences. An example of a software application that utilizes a natural language interface is VIA VOICE™ by IBM Corporation.

Software program 30 comprises a natural language (NL) input system 20 for inputting natural language commands; a translation system 22 for extracting a "request" from the NL command and storing the request in a host-independent format; a routing system 24 for servicing the request, wherein the routing system comprises a mechanism for selecting a host, for converting the request into a host dependent directive, and for forwarding the directive to the selected host; an output system 26 for outputting both the request and a response received from the selected host; and a control agent 28 that controls the flow of information through the system. Each of these components will be described in more detail below.

Figure 2:
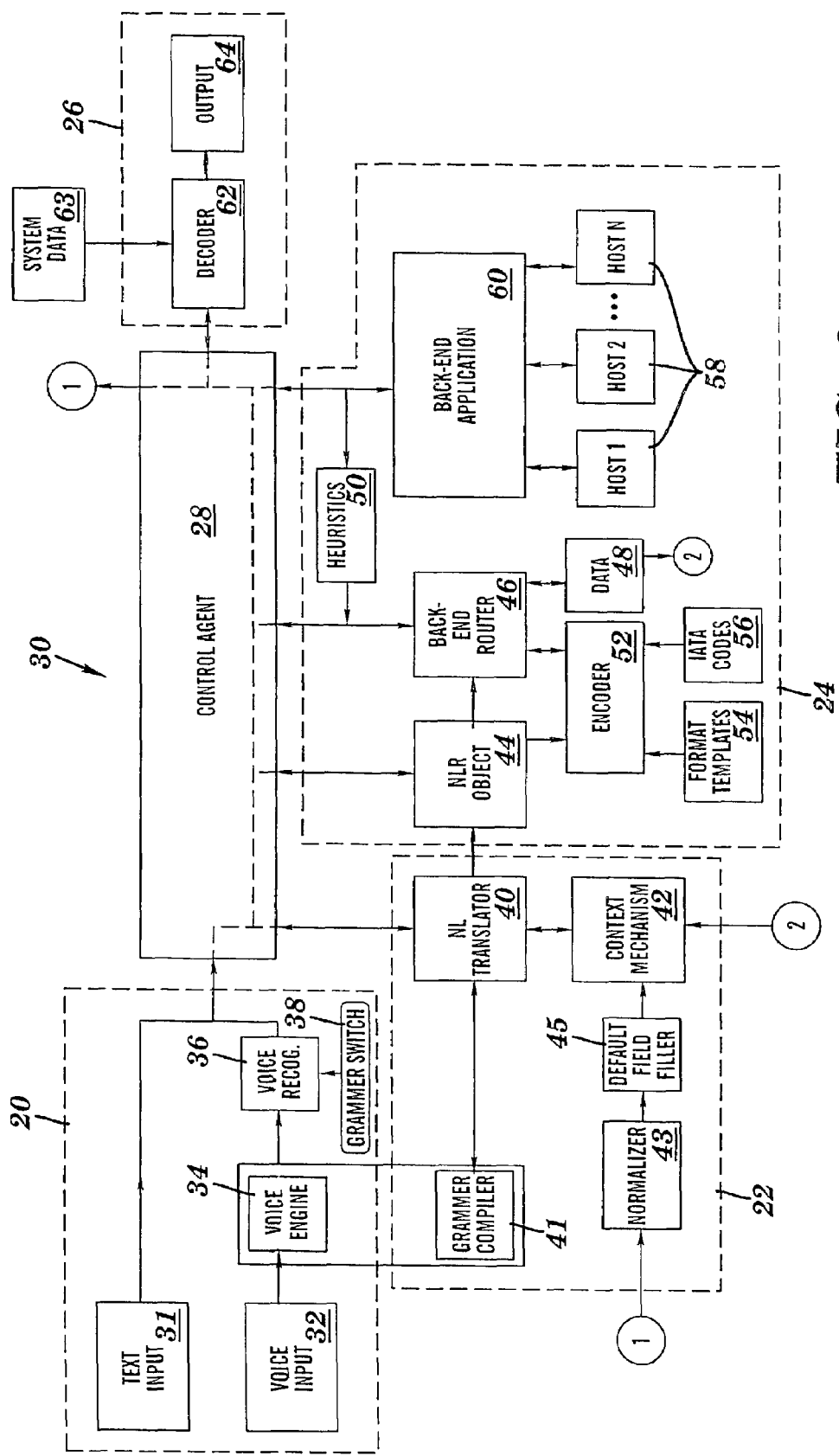
FIG. 2 depicts a block diagram of the computer program residing in the computer system of FIG. 1.

Referring now to FIG. 2, software program 30 is shown in detail. It should be appreciated that the grouping of the many functional components shown in FIG. 2 into systems 20, 22, 24, and 26, has been done primarily for the purposes of convenience in describing this embodiment and such groupings are not meant to limit the invention. Control agent 28 controls and manages the operation for, and flow of information among, each of the systems 20, 22, 24, and 26. While depicted as a separate entity, control agent 28 could be implemented in any manner without departing from the scope of the invention, including being incorporated into one or more of systems 20, 22, 24, and 26.

Software program 30 comprises input system 20 that includes two mechanisms, text input 31 and speech input 32, for inputting NL commands. A typical NL command might be "show me the flights from Boston to Miami this Friday that leave December 31 after 5:00 P.M. on AMERICAN AIRLINES™." This could be inputted in a text format via text input 31 implemented as, for example, a keyboard and/or mouse that interface with a graphical user interface (GUI). Alternatively, the command could be inputted as speech (i.e., an uttered command) into a speech engine 34, which forwards the uttered command to a speech recognition system 36. Speech recognition system 36 converts the uttered command into a text format. Speech engine 34 and speech recognition system 36 can comprise any system (e.g., VIA VOICE™ by IBM Corp., NATURALLY SPEAKING™ by DRAGON SYSTEMS™, etc.) and use any type of interface, including SMAPI, SAPI, JSAPI, etc. In addition, a grammar switch 38 may be included to restrict the end-user to a specific set of phrases. For example, grammar switch 38 may be set to recognize grammar specific to airline reservations, train reservations, cruise reservations, auto reservations, etc.

Once the command is in a text format, control agent 28 forwards the command to translation system 22, and more specifically to an NL translator 40 which parses the command into a set of "request elements." There exist many different possible implementations for NL translator 40. For example, VIA VOICE™ comprises a grammar-based system that utilizes a grammar compiler 41 to convert a command to an annotated string comprised of the request elements. Other possible implementations could comprise statistical parsing or machine translation techniques, such as maximum entropy or source channel, that utilize a probabilistic scoring metric to score different interpretations. In a statistical-based system, the space of possible semantic meanings is searched, and a score is provided based on the likelihood that the English will match. For example, if the user said "show me the flights from A to B on UNITED on Saturday morning," the system would compare this to hundreds of possible meanings in some canonical space. The statistical model learns that certain phrases in English lead to certain "clauses" in the "formal language" sentence. Then, at run time, the statistical translator searches the space of all possible formal language sentences (of which there are exponentially many), and scores them according to the model. The formal language sentence is then found as the output with the most probable formal language sentence.

Furthermore, the system could utilize word or phrase spotters to recognize specific semantic clauses. Such systems may use regular expressions, such as:

AIRLINE:=[semantically irrelevant words] airline
[more semantically irrelevant words], which recognizes specific airlines, not by a grammar, but instead by seeing the airline name somewhere in the sentence. Other implementations involve "information retrieval," where the system finds the most likely document from a set of candidates by scoring how well the words in the query match the ones in the candidate documents. Accordingly, while this embodiment describes a grammar based parsing system, it is understood that any other system for extracting elements from a sentence, such as those described above, could be used.

In the case of the command stated above, "show me the flights from Boston to Miami this Friday that leave December 31 after 3:00 P.M. on AMERICAN AIRLINES™," the request elements might include, day of the month=31, month of the year=12, time=1500, city of origin=BOS, city of destination=MIA, and airline=AA. This information may then be outputted back to the user via output system 26, for example, displayed on a screen within a GUI or as speech.

In the event NL translator 40 cannot extract a complete set of request elements from the command, a context mechanism 42 may be used to disambiguate the request, e.g., fill in needed details, or cause control agent 28 to query the user for more details. Disambiguation may be defined as the process of translating an ambiguous or incomplete request into a complete request. For example, the command, "book me on the UNITED™ flight," by itself is ambiguous. Without additional details (e.g., flight number, etc.), the command could not be submitted to a host. Context mechanism 42 disambiguates current requests by utilizing elements from previous response(s) and/or request(s) stored in a data cache. For example, suppose that after a response to the initial command, "show me the flights from Boston to Miami that leave December 31 after 5:00 P.M. on AMERICAN AIRLINES," the user submits a new command, "how about on UNITED?" The command, "how about on UNITED?" by itself clearly lacks enough context to form a complete request. However, context mechanism 42 can compute a complete request by borrowing elements from the previous response or request, namely, day of the month=31, month of the year=12, time=1500, city of origin=BOS, city of destination=MIA, and combining them with elements from the current request, namely, airline=UN. In this case, the request element from the new request, i.e., UNITED AIRLINES, has replaced the corresponding request element from the previous request.

Accordingly, context mechanism 42 allows an end user to submit a series of related commands without having to re-enter repeated portions of those commands. Context mechanism 42 may utilize any algorithm that borrows data from prior response(s) and/or request(s) to disambiguate a present request. Moreover, when context mechanism 42 cannot provide context based upon prior request or response elements, context mechanism 42 can cause control agent 28 to query the user for more details. For example, if the first command was "how about on UNITED," and no previous context existed, context mechanism 42 can cause control agent 28 to ask "where do you want to fly from and to?" The operation of context mechanism 42 is described in more detail below with reference to FIG. 4.

Once NL translator 40 has translated the command into a request comprised of a set of request elements, the request elements are forwarded to routing system 24, and are stored in a generic format in a natural language request (NLR) object 44. NLR object 44 comprises a set of fields that stores each of the request elements. A detailed example and description of NLR object 44 is provided below with regard to FIG. 5. At this point, the end user may want to modify the "un-serviced" request, which is displayed by output system 26. This can be accomplished by directly modifying the information in the NLR object, via the input system 20 with, for example, a graphical user interface (GUI).

Routing system 24 "services" the request either locally, e.g., via a local database or cache, or remotely, e.g., via a host. A request may be serviced, for example, by obtaining a response such as flight availability, or by performing some action, such as booking a flight. In order to service a request, a back-end router 46 first determines whether the request can be serviced locally by a data source 48. Data source 48, may for example, comprise a cache of recent requests and responses, thereby avoiding the need to remotely service repetitive requests. Accordingly, using a local data source reduces costs and saves time. Data source 48 may simply point to, or include, the same data stored by context mechanism 42.

If the request cannot be serviced locally, back-end router 46 must then determine which host or hosts 58 should be used to remotely service the request. Thus, for an airline reservation embodiment, hosts may comprise different CRS's, such as APOLLO, SABRE, WORLDSPAN, etc. The choice of which host to use may be defined by the user (via a command), by the system (e.g., set by a systems administrator), or by a heuristic 50. Heuristic 50 may comprise any decision making system, and include factors such as cost, capability, availability, speed and/or reliability. Thus, for example, heuristic 50 may comprise a software routine that calculates which of the plurality of hosts 58 is most likely to service the request the fastest based on previous inquiries. Alternatively, heuristic 50 could compute the likely cost to have each host 58 service the request, and choose the cheapest one. Obviously, many possible implementations for heuristic 50 exist and any such implementation is believed to fall within the scope of this invention. Once a host is chosen, the request, which is stored in NLR object 44 in a host-independent format, must be converted into a host-dependent directive, since each host 58 typically utilizes a unique syntax. An example of a host dependent directive for a CRS such as Apollo might look something like:

A31DECBOSMIA3P+AA, where A=flight availability, 31=day of the month, DEC=month, BOS=departing city, MIA=arriving city, and AA=airline. Encoder 52 converts the request into a host dependent directive using format templates 54. Each of format templates 54 corresponds to one of the plurality of hosts 58 and provides a mapping from a host-independent request to a unique host-dependent directive. Format templates 54 may be implemented such that they are easily accessible should a new host be added, or should an existing host change its syntax. For example, each of format templates 54 may be accessible through a GUI. Additional data, such as IATA codes 56, which provide the three letter codes for airports (e.g., MIA=Miami International Airport), rental cars, city codes, etc., may also be made available. Easy access to the database of IATA codes is also provide through a GUI since the codes are subject to change from time to time. Having the codes 56 stored locally avoids the need to make remote host inquiries to determine, for example, what airport a code represents.

Once the host-dependent directive is created, it is sent to control agent 28, and is forwarded to a selected back-end application 60, which submits the directive to the appropriate host 58. The selected host 58 services the directive by providing a response and/or taking some action. The response is returned to back-end application 60, and then to control agent 28. The response is then passed to the output system 26 where it is decoded via decoder 62 and provided to the end-user as output 64. Output 64 may comprise any type of output, e.g., a text display within a GUI, audio output via a telephony system, etc. During this process, selected host 58 and back-end application 60 may provide information (e.g., the availability of the selected CRS, the cost to service the request, the time to service the request, etc.) that heuristic 50 can use to select hosts 58 in the future. In addition, the response may be returned to translation system 22, where it is passed through normalizer 43 and default field filler 45, and then stored in host context mechanism 42 for the purposes described above. Normalizer 43 converts the host response from a host specific format into a generic format, and the default field filler 45 inserts details not provided by the host, for purposes described below.

Decoder 62 provides NL generation by utilizing various pieces of system data 63 to provide "intelligent" responses for the end-user via output 64. Intelligent responses comprise formulated NL responses that take into account relevant pieces of information from the system, in addition to the response data that may have been returned by the selected host. For instance, decoder 62 could examine the way in which a command was stated to decode and formulate an intelligent response. For example, if a user asked "what are the morning flights . . . , " decoder 62 could generate a response "the morning flights are . . . . " Alternatively, if the user asked, "what are the flights between six and ten," decoder 62 could output "the flights between six and ten are . . . . " This could be accomplished by having the decoder 62 formulate output based on the user's command, as well as the response. Thus, system data 63 may comprise a command cache that stores commands. The command cache could be implemented, for example, in context mechanism 42, NL translator 40, NLR object 44, or by a totally separate database.

Another reason for providing intelligent responses is that users like confirmation that the system understood the command. Thus, if the user first asked for flights between A and B, the system should reply "flights between A and B are . . . . " If the user then says "UNITED flights," the system should say "the UNITED flights are. . . . " The decision on which pieces of information to omit (e.g., A and B in the second response) can be implementation specific. However, failing to omit "implicitly confirmed" data, results in responses like, "the UNITED morning flights from A to B serving breakfast and stopping in Chicago are. . . ," which are typically not necessary. Thus, decoder 62 may be implemented to only provide confirmation of the new data, which could likewise be determined by examining the command cache.

A further implementation of decoder 62 involves responding to "explicit" portions of a command. For example, consider the case where the user asks something like, "what are the arrival times of flights from A to B." This query will likely be interpreted as a request for flights from A to B, even though the user is explicitly interested in arrival times. An intelligent response to this query could include the list of flights with the arrival times highlighted in the output stream displayed within a GUI, or mentioned in the audio for telephony (e.g., "arrival times for flights from A to B are . . . "). To implement this, NLR object 44 could include one or more control bits for each field to indicate if the user explicitly requested this information. In the case above, control bits in the arrival time field would be enabled to indicate that the response should include or highlight arrival time information.

It is understood that decoder 62 may comprise any type of algorithm or system for providing intelligent responses based upon system data 63, and any such implementations are believed to fall within the scope of this invention. Thus, system data 63 may comprise any information obtainable from software program 30, including but not limited to: data in the command cache, NLR object 44, and context mechanism; IATA codes 56, response data, and routing data 48.

Figure 3:
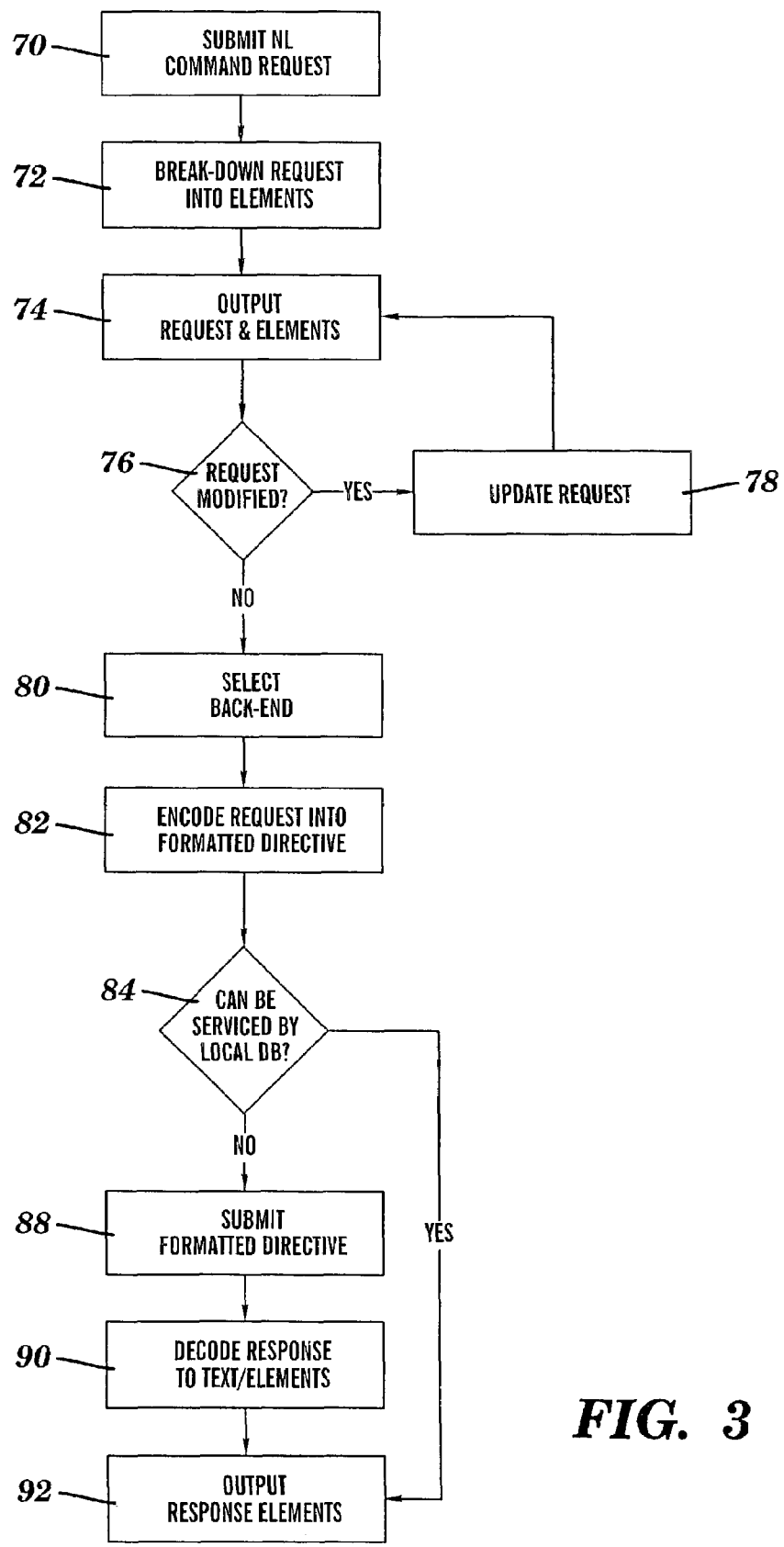
FIG. 3 depicts a flow chart of an operation of the computer program residing in the computer system of FIG. 1.

Referring now to FIG. 3, a flowchart is shown depicting the operation of software program 30. First an NL command is submitted at step 70. Next, the NL command is translated and broken down into request elements at step 72. The request elements are then output for the user to inspect at step 74. The user is then given an opportunity to modify the request at step 76. If the request requires modification, the request is updated 78 and the new request is outputted 74. Subsequently, a back-end host is selected 80, and the request is encoded into a host-dependent directive 82. Next, the system checks to see if the request can be serviced by a local database 84. If it can be serviced locally, a response is generated and the response elements are displayed/spoken 92. If the request cannot be serviced locally 84, the directive is submitted to the chosen host 88, and a response is generated. The response is decoded into a set of response elements 90, and the elements are displayed or spoken 92. The user may at that point further modify or refine the request by submitting a new NL command.

Figure 4:
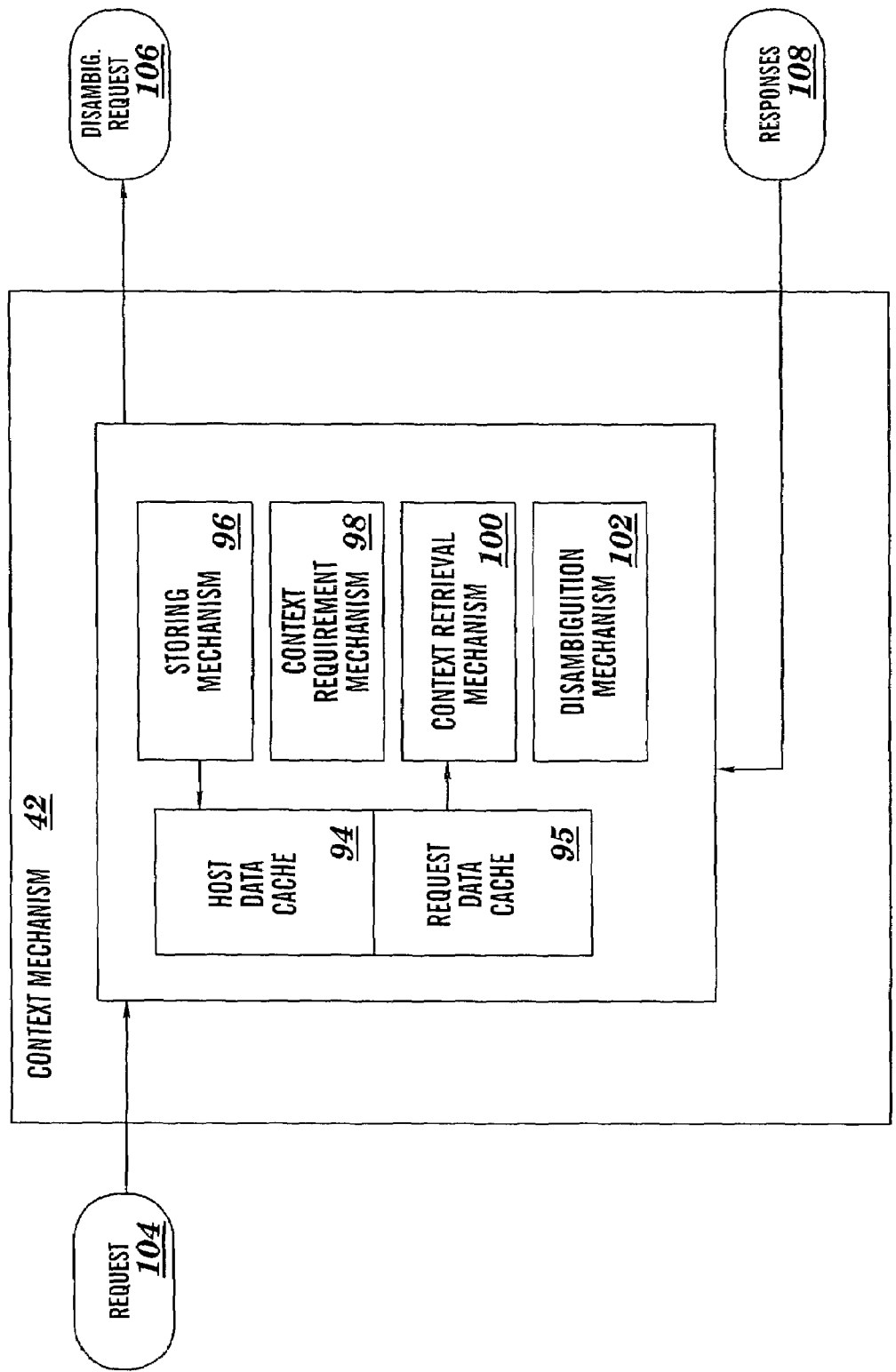
FIG. 4 depicts a block diagram of a context mechanism.

Referring now to FIG. 4, a diagram is depicted showing the operation of context mechanism 42. Context mechanism 42, as noted above, may be used to "disambiguate" a request 104. Context mechanism 42 creates a disambiguated request 106 by using details or context from one or more previous responses 108 stored in host data cache 94 and/or previous requests stored in request data cache 95. Thus, for example, suppose a user first submitted the command, "show me the flights from Albany to Orlando on November 20," and the system returned information for three flights, one on UNITED, one on DELTA, and one on AMERICAN. Now suppose a subsequent command was submitted, "book me on the UNITED flight." Context mechanism 42 would search host data cache 94 to obtain the necessary details (e.g., the flight number for UNITED returned by the previous response) and create disambiguated request 106. Because a user is typically responding to what they were just told, context mechanism 42 allows the end-user to interact with the system in a natural way, without having to repeat or retrieve every detail.

Context mechanism 42 comprises a storing mechanism 96 that stores previous responses 108 in the host (or response) data cache 94. An example of host data cache 94 is described in more detail below with respect to FIG. 7. Storing mechanism 96 may also store previous requests in request data cache 95. An example of request data cache 95 is described in more detail below with respect to FIG. 6. It should be recognized that the host and request data caches 94 and 95, as well as any other data source described herein, can be implemented in any known fashion, e.g., as an SQL database, in a shared database, as temporary storage, in RAM, as a data object, etc. In addition, it is understood that the amount of records maintained in each cache depends upon the specific implementation. For example, request data cache 94 may be implemented such that only a single past request 104 is stored. In this case, NLR object 44 could act as request data cache 94.

Context mechanism 42 also includes a context requirement mechanism 98 that determines whether context is required, i.e., whether disambiguation is required. This process can be implemented in any known fashion. For example, suppose a user states "show me the later flights." The word "later" could be used to indicate that context is required. Other options would be to include a "checking" system that could analyze a request 104 and determine if enough details are provided. If enough details are not provided, additional details would be pulled from a previous response or request using context retrieval mechanism 100. For the case where additional context is needed to disambiguate a request, a disambiguation mechanism 102 would be used.

Disambiguation mechanism 102 comprises logic that generates disambiguated request 106 based on: (1) an ambiguous set of request elements, and (2) elements from previous request(s) and/or response(s). The logic can be implemented in any manner. For example, disambiguation mechanism 102 may overlay current request elements (e.g., UNITED AIRLINES) onto elements from a previous response (e.g., TWA flights from Paris to London leaving on July 1) to form a disambiguated request (UNITED flights from Paris to London leaving on July 1). Disambiguation mechanism 102 can also include logic to perform calculations. For example, in order to disambiguate the command, "what DELTA flights return in ten days," information from a prior request/response must be obtained, followed by a calculation of adding ten to the departing day to determine a return date. The disambiguated request can be outputted back to the user for verification. If disambiguation mechanism 102 cannot build a disambiguated request, it can query the user for the needed request elements.

Figure 5:
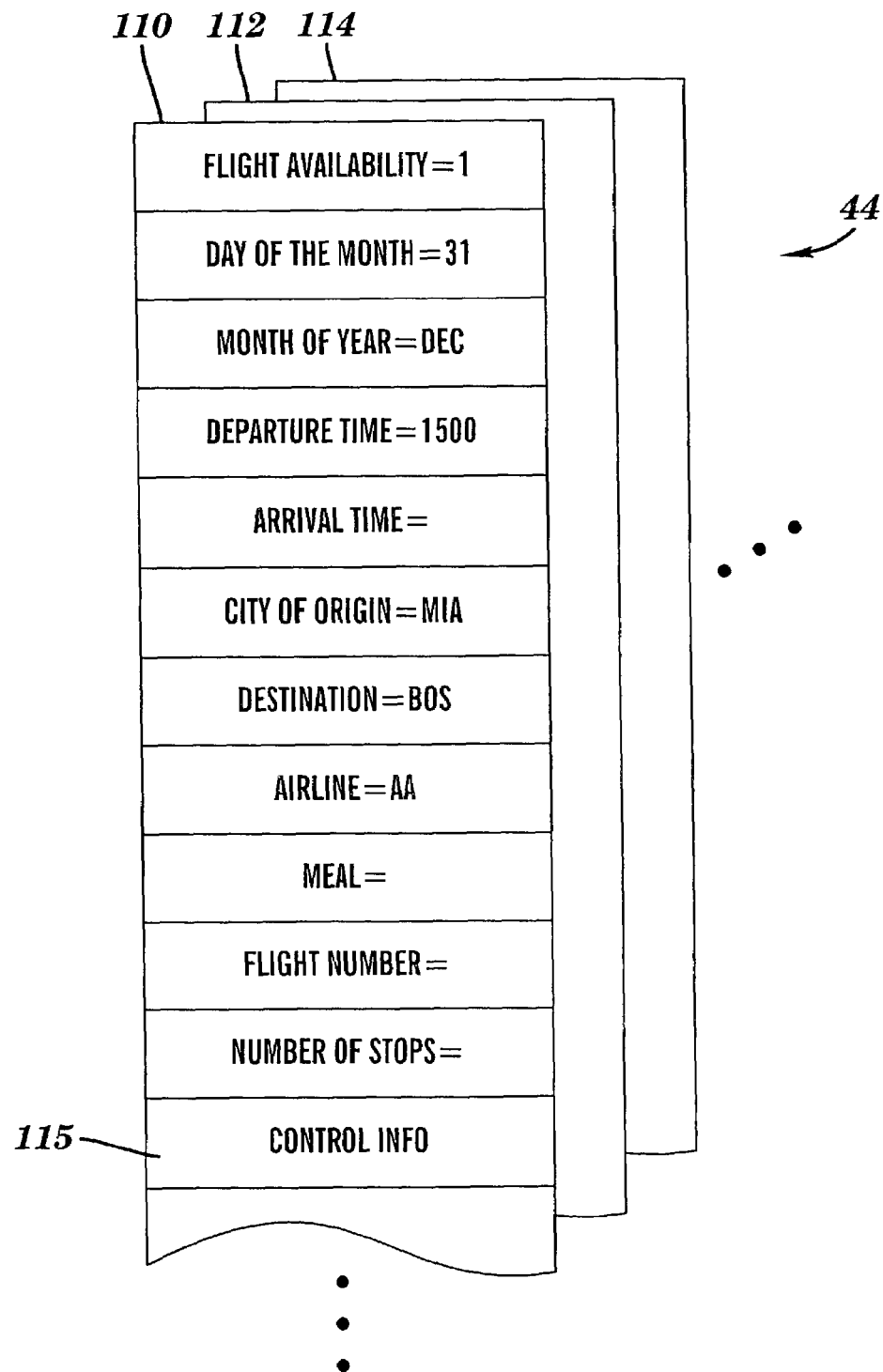
FIG. 5 depicts the contents of a natural language request object.

Referring now to FIG. 5, a diagram is depicted showing NLR object 44. NLR object 44 may comprise multiple types of records for different types of travel. For example, record 110 is set up to store flight reservation, while records 112 and 114 may be set up to handle car reservation requests, cruise reservation requests, rail reservation requests, etc. Each record comprises a number of fields that contain different types of information. Record 110 comprises a flight information request that could have resulted from the command, "show me the flights from Miami to Boston on December 31 on AMERICAN departing around 3:00 P.M." As is evident from the diagram, additional details, e.g., arrival time, could have been included in the command, but would not be necessary to obtain a response. Moreover, the type and number of fields are in no way limited, and may be determined by the particular implementation. For example, in addition to including flight request information, record 110 comprises a control info field 115 that can be used by output system 26 to generate an intelligent response. Thus, control info 115 could comprise a control bit for each field, which could be used to indicate whether to include that piece of data as part of the response. It is understood that there exists any number of possible implementations and uses for control information, and all such implementations and uses are believed to fall within the scope of this invention.

Referring now to FIGS. 6 and 7, a sample request data cache 95 is depicted as well as a corresponding sample host data cache 94. Request data cache 95, shown in FIG. 6, comprises two stored records, request #1 and request #2. Record 120, which contains request #1, reflects the most recent request stored in NLR object 44 shown in FIG. 5. Record 122, which contains request #2, reflects a previous request. Host data cache 94 comprises five records. The first two records 116 in host data cache 94 correspond to the request #1 in request data cache 95. The last three records 118 in host data cache 94 correspond to the request #2 in request data cache 95. Thus, two records (response #1 and response #2) were returned in response to request #1, "show me the flights from Miami to Boston on December 31 on AMERICAN departing around 3:00 P.M." The responding records include flights 832 and 1014. The second request, "show me the flights from Albany to Orlando on November 20," returned three records 118 and include flights 111 on UNITED, 907 on DELTA, and 4210 on AMERICAN.

Also included in each record of host data cache 94 are default fields 124 that comprise a host identifier (e.g., host #), response identifier (response #), and request identifier (identifier #). The host identifier determines which host, e.g., Worldspan, was used to service the request. The response identifier keeps track of each response for a given request. The request identifier determines which request the records were generated in response to. Response data cache 95 likewise includes a host identifier, (in the event the user specifies which host to use) and a request identifier. The request number acts as a time stamp to let the system know which request was most recently submitted. Although not required, each of the records in host data cache 94 is stored in a uniform or normalized fashion. This is accomplished by passing responses to normalizer 43 (see FIG. 2) that converts a host dependent response into a generic format. After a response is passed through normalizer 43, default field filler 45 (see FIG. 2) is used to add default information into default fields 124, such as the host identifier, response identifier, etc. Since default information is important for keeping track of response information within context mechanism 42, but is not typically provided by a host, default field filler 45 is utilized to insert such information. It is understood that the type of default information provided by default field filler 45 depends upon the particular implementation of context mechanism 42.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

We claim:

1. A method for servicing natural language instructions with a plurality of hosts, comprising the steps of:
    inputting a natural language command into a natural language translator;
    interpreting a request from the natural language command;
    storing the request in a host-independent format;
    selecting a single host from the plurality of hosts;
    converting the request to a host dependent directive for the selected host;
    submitting the host dependent directive to the selected host; and
    obtaining and outputting a response.

2. The method of claim 1, wherein the step of interpreting the request comprises the step of disambiguating the request with a previous response that specifically answers a previous request.

3. The method of claim 1, wherein the step of selecting a host comprises the step of utilizing a heuristic to determine which of a plurality of hosts should be selected.

4. The method of claim 1, wherein the step of converting the request to the host dependent directive includes the steps of:
    providing a plurality of format templates, wherein each format template corresponds to one of the plurality of hosts;
    choosing a format template that corresponds to the selected host; and
    encoding the host dependent directive based on the chosen format template.

5. The method of claim 1, wherein the step of selecting a host comprises the step of first attempting to service the request with a local data source.

* * * * *